United States Patent Office 2,898,360
Patented Aug. 4, 1959

2,898,360
PRODUCTION OF DICYCLOPENTADIENYL IRON

John Paul Hogan and Lloyd E. Gardner, Bartlesville, Okla., assignors to Phillips Petroleum Company, a corporation of Delaware No Drawing. Application May 17, 1954
Serial No. 430,423

5 Claims. (Cl. 260—439)

This invention relates to the production of dicyclopentadienyl iron. In one of its more specific aspects, it relates to an improved continuous process for the preparation of dicyclopentadienyl iron. In another of its more specific aspects, it relates to the use of an improved solid reactant material in a process for the production of dicyclopentadienyl iron.

Until recent years, it was generally thought that direct replacement by iron of hydrogen attached to carbon would be an impractical operation. Processes for the preparation of organic iron compounds, such as dicyclopentadienyl iron, are, however, now disclosed in the art. In the petroleum industry, considerable interest has been shown in this specific compound, sometimes known as ferrocene, because it can be prepared from petroleum hydrocarbon fractions containing cyclopentadiene.

One of the known methods for the preparation of ferrocene comprises reacting cyclopentadiene with reduced iron in a nitrogen atmosphere in the presence of alumina, potassium oxide and molybdenum oxide at atmospheric presure and at an elevated temperature. When operating in this manner, however, the conversion of the reduced iron into ferrocene proceeds for only a limited period of time, e.g., 10 to 20 minutes or less. It should be apparent that the above-described prior art process is unsuitable for the production of ferrocene on a commercial scale. In accordance with the present invention, a continuous process is provided for the production of ferrocene.

Dicyclopentadienyl iron may be advantageously used as an additive material for motor fuels in order to inhibit formation of carbon. The use of dicyclopentadienyl iron in hydrocarbon fuels, which would otherwise be of limited value because of the carbon deposition problem, permits the utilization of a broader range of materials in the operation of jet engines without encountering the problem of undue carbon deposition.

The following objects of the invention will be attained by the various aspects of the invention.

It is an object of the present invention to provide an improved process for the production of dicyclopentadienyl iron.

Another object of the invention is to provide a novel solid reactant material for use in a process for the production of dicyclopentadienyl iron.

Still another object of the invention is to provide a commercially feasible, continuous process for the production of dicyclopentadienyl iron.

Other and further objects and advantages will become apparent to those skilled in the art upon study of the accompanying disclosure.

Broadly speaking, the present invention resides in reacting cyclopentadiene with reduced alkalized iron oxide in the presence of chromium oxide. It has been found that by using an improved solid reactant material, to be described more in detail hereinafter, a continuous process for the production of dicyclopentadienyl iron is made possible, thereby eliminating one of the major disadvantages, i.e., very short reaction periods, of the prior art processes.

Solid reactant material comprising 87 weight percent ferric oxide, 10 weight percent potassium hydroxide and 3 weight percent chromium oxide, which has been reduced as described hereinafter, has been found to be very effective in the production of dicyclopentadienyl iron. Another effective reactant material composition comprises 67 weight percent ferric oxide, 30 weight percent potassium hydroxide and 3 weight percent chromic oxide. The solid reactant material of the present invention may be prepared by mixing or co-grinding or promoting iron oxide with chromium oxide and incorporating therein a suitable inorganic alkalizing agent. As an alkalizing agent, one or more of the common alkalis may be used, e.g., oxides, hydroxides, and/or salts (e.g., carbonates) of the alkalis or even alkaline earth metals. Accordingly, a salt which is decomposable to the oxide is ordinarily employed. In the case of alkaline earth compounds, salts hydrolyzable to the hydroxides may be used when water is added in the process of manufacturing the solid reactant material, e.g., just prior to extrusion. The various compounds of potassium or other alkali metal are alternatives of potassium hydroxide.

In general, the solid reactant material will have a composition in weight percent as follows: 0.5–50 potassium hydroxide, 1–40, and preferably 1–30, chromium oxide and the remainder iron oxide. The iron oxide preferably constitutes the major portion of the total solid reactant material. Thus, the iron oxide is the major active constituent, preferably in excess of all other constituents combined, with the possible exception of a carrier. Accordingly, a preferred reactant material composition contains between 65 and 90 percent iron oxide. The proportions of constituents of the solid reactant material, as set forth herein, are given with reference to the composition which is to be reduced with hydrogen or other suitable reducing gas prior to use in the process of the invention.

The iron oxide and chromium oxide may be combined by thermally decomposing a mixture of the nitrates, by coprecipitating the oxides, or by mixing the hydrous gels. One particularly suitable method is to thoroughly mix by co-grinding a mixture of powdered iron oxide and powdered chromium oxide. This mixture is then formed into a paste by the addition of a solution containing the desired amount of potassium compound, extruded or pelleted, dried and calcined at a temperature between 1300 and 1800° F. and preferably between 1450 and 1750° F. In accordance with the present invention, the solid reactant material, as described above, is reduced with hydrogen at an elevated reducing temperature, e.g., a temperature in the range of about 650° F. to 1000° F. In a preferred embodiment of the invention, the solid reactant material is subjected to reducing conditions for a period of at least four hours.

The iron oxide may be prepared by calcining a precipitated iron oxide in the form of a powder at an elevated temperature, e.g., a temperature in the range of 1475° F. to 1600° F., until its surface area has been reduced to below about 8 square meters per gram or until its density is equivalent to about 250 pounds per barrel. At this stage, the iron oxide is of a brownish-red color and has a formula of $Fe_2O_3$. Furthermore, calcination may be effected under reducing conditions, in which event the iron oxide will be partly or completely in the form of black $Fe_3O_4$. Since the solid reactant material of this invention is reduced at an elevated reducing temperature prior to use, the iron therein will be essentially in the form of elemental iron, although there may be present some incompletely reduced iron oxide.

The solid reactant material may take any one of several conventional forms. For example, the material may be in the form of powder, pellets, pills, spheres, etc., the size and shape chosen being adapted for use in the particular reaction system utilized in carrying out the process of the invention. In this latter regard, the process of the invention may be conducted in a fixed bed reactor, or in a fluidized bed, a suspended bed or moving bed system. When using a fixed bed reactor, it is advantageous to employ more than one reactor. When operating in this manner, a reactor may be continuously maintained on stream while the supply of solid reactant material in the other reactor or reactors is replenished.

Any available source of cyclopentadiene may be utilized to provide the necessary gaseous reactant material. Cyclopentadiene is a low boiling cyclic diolefin present in the various reaction products resulting from the pyrolysis of various organic compounds, such as natural gas or paraffinic and naphthenic hydrocarbons. It is preferred, therefore, to use petroleum hydrocarbon mixtures containing cyclopentadiene and resulting from the pyrolysis of petroleum fractions. A gaseous feed comprising cyclopentadiene and hydrogen is particularly suitable, but other cyclopentadiene-containing feeds in which hydrogen is not present may be used. The gaseous feed utilized may also contain dicyclopentadiene which will decompose, at least to some extent, into cyclopentadiene under reaction conditions. Since hydrogen aids in maintaining the activity of the solid reactant material during conduct of the process, it is preferred that hydrogen be present in the feed.

In accordance with the process of the invention, the gaseous feed containing cyclopentadiene, and preferably also containing hydrogen, is passed into a reaction zone containing the solid reactant material, i.e., reduced alkalized iron oxide in the presence of chromium oxide. The solid reactant material and cyclopentadiene react to produce dicyclopentadienyl iron which remains in the reaction zone for the most part coated upon the solid reactant material. The reaction is conducted at a temperature above about 500° F., and preferably at a temperature of between about 550° F. and 700° F. The gaseous feed may contact the solid reactant material at a space velocity of between 100 and 4000 volumes of gaseous feed per hour per volume of solid reactant material. The pressure in the reaction zone is controlled so as to maintain a partial pressure of cyclopentadiene in the range of about 2 to 50 p.s.i.a. and higher, if desired.

Since the iron contained in the solid reactant material enters into the reaction with the cyclopentadiene to form dicyclopentadienyl iron, it becomes necessary to periodically replenish the reaction zone with fresh solid reactant material. In this regard, approximately 30 pounds of iron is used in the synthesis of 100 pounds of product. Furthermore, it is desirable at the same time to withdraw from the reaction zone at least a portion of the remaining solid material, including dicyclopentadienyl iron, so as to prevent an excessive build-up of alkali and chromium oxide. The dicyclopentadienyl iron formed in the reaction zone may be then recovered from the solid material so withdrawn by dissolving the dicyclopentadienyl iron in a solvent, such as acetone, and thereafter crystallizing out the dicyclopentadienyl iron. Other suitable solvents which may be used include alcohol, benzene and ether.

A more comprehensive understanding of the invention may be obtained by reference to the following example which is not intended, however, to be unduly limitative of the invention.

Feed gas having the composition set out in Table I below was passed over a solid reactant material comprising 87 weight percent ferric oxide, 10 weight percent potassium hydroxide and 3 weight percent chromium oxide at a temperature which varied between 590 and 670° F., the average temperature being 600° F., at a pressure of 700 p.s.i.g., and at a space velocity of 3000 volumes of feed gas per hour per volume of solid reactant material.

TABLE I

*Feed composition*

| Component: | Mol percent |
|---|---|
| Hydrogen | 13.2 |
| Methane | 73.2 |
| Ethane | 8.4 |
| Propane | 2.3 |
| n-Butane | 0.6 |
| Cyclopentadiene | 2.3 |
| | 100.0 |

Ultraviolet analyses of feed and reactor effluent samples indicated that 14 percent of the cyclopentadiene in the feed was reacted. About 82 percent of the cyclopentadiene in the feed was recovered in a Dry Ice trap following the reactor. Mass spectrographic analysis of the trap effluent indicated that the remaining 4 percent of the cyclopentadiene was in the tail gas.

The dicyclopentadienyl iron produced in the above run was crystallized from acetone. A sample of this dicyclopentadienyl iron and a sample of commercial dicyclopentadienyl iron were analyzed, the results of the analysis being given in Table II below.

TABLE II

| Component Weight, Percent | Commercial Ferrocene | Compound Recovered | Theoretical |
|---|---|---|---|
| Fe | 29.96 | 29.82 | 30.02 |
| C | 64.49 | 64.44 | 64.55 |
| H | 5.55 | 5.74 | 5.43 |

The data in Table II indicate that the compound recovered is dicyclopentadienyl iron.

Reactor feed and effluent samples were taken periodically, and cyclopentadiene monomer concentration was determined by ultraviolet analysis. The results of the ultraviolet analysis are indicated in Table III. The percent cyclopentadiene reacted was calculated from ultraviolet analysis figures.

TABLE III

*Conversion of cyclopentadiene monomer*

| Hours on Stream | Max. React. Temp., °F. | Mol Percent CPD in Feed | Mol Percent CPD in Effluent | Percent of CPD Reacted |
|---|---|---|---|---|
| 0.5 | 598 | 2.04 | 1.55 | 24 |
| 1.5 | 602 | 2.19 | 1.88 | 14 |
| 2.5 | 603 | 2.16 | 1.94 | 10 |
| 3.5 | 602 | 2.38 | 2.14 | 10 |
| 4.5 | 602 | 2.27 | 2.03 | 11 |
| 5.5 | 602 | 2.31 | 1.97 | 15 |

From a consideration of the data contained in Table III, it is apparent that the percent of cyclopentadiene reacted remained substantially constant over a period of 5½ hours.

It will be apparent that we have achieved the objects of our invention in that we have provided a continuous process for the production of dicyclopentadienyl iron. By operating in the described manner, a commercially feasible process for the production of dicyclopentadienyl iron is provided. As will be evident to those skilled in the art, various modifications of this invention may be made or followed in the light of the foregoing disclosure and description without departing from the spirit or scope of the disclosure.

We claim:

1. A process for the production of dicyclopentadienyl iron which comprises passing cyclopentadiene into a reaction zone in a gaseous stream comprising about 13.2 mol percent hydrogen and having a partial pressure of cyclopentadiene in the range 2 to 50 p.s.i.a.; containing said cyclopentadiene with a reduced alkalized iron oxide-chromium oxide reactant material at a temperature between about 550° F. and 700° F.; and removing from said reaction zone solid material containing dicyclopentadienyl iron.

2. The process of claim 1 in which said reactant material contains between 65 and 90 weight percent iron oxide.

3. The process of claim 1 in which said reactant material contains about 67 weight percent iron oxide, about 30 weight percent potassium hydroxide and about 3 weight percent chromium oxide.

4. The process of claim 1 in which said reactant material contains about 87 weight percent iron oxide, 10 weight percent potassium hydroxide, and 3 weight percent chromium oxide.

5. A process for the production of dicyclopentadienyl iron which comprises passing cyclopentadiene into a reaction zone in a gaseous stream comprising hydrogen and having a partial pressure of cyclopentadiene in the range 2 to 50 p.s.i.g. and contacting said gaseous stream with a reduced alkalized iron oxide-chromium oxide reactant material at a temperature between about 500° F. and 700° F.

References Cited in the file of this patent

UNITED STATES PATENTS 2,769,828    Sieg ------------------ Nov. 6, 1956

OTHER REFERENCES

Miller et al.: J. Chem. Soc., 1952, pp. 632 to 635.